US011277729B1

(12) United States Patent
Dizengof et al.

(10) Patent No.: US 11,277,729 B1
(45) Date of Patent: Mar. 15, 2022

(54) CLOUD PROCESSING OF DATA RECEIVED BY SERIAL COMMUNICATION BASED PSAP EQUIPMENT

(71) Applicant: Carbyne Ltd., Tel-Aviv (IL)

(72) Inventors: Alexander Dizengof, Ashdod (IL); Roy Shmuli, Hod Hasharon (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

(21) Appl. No.: 17/115,986

(22) Filed: Dec. 9, 2020

(51) Int. Cl.
*H04W 4/90* (2018.01)
*H04L 12/66* (2006.01)
*H04W 4/14* (2009.01)
*H04W 76/50* (2018.01)
*H04W 88/16* (2009.01)

(52) U.S. Cl.
CPC .............. *H04W 4/90* (2018.02); *H04L 12/66* (2013.01); *H04W 4/14* (2013.01); *H04W 76/50* (2018.02); *H04W 88/16* (2013.01)

(58) Field of Classification Search
CPC ......... H04W 4/90; H04W 4/14; H04W 76/50; H04W 88/16; H04L 12/66; H04L 65/1046; H04L 65/1033; H04L 65/1053; H04L 65/102; H04M 3/5116; H04M 2242/04; H04M 7/1205
USPC ............ 455/404.1, 412.1–412.2, 414.1, 521; 379/33, 37–51
See application file for complete search history.

(56) References Cited

U.S. PATENT DOCUMENTS

| 10,264,122 B1* | 4/2019 | Jensen ................. H04M 3/5116 |
| 2003/0137976 A1* | 7/2003 | Zhu ..................... H04L 12/1403 370/354 |
| 2008/0261554 A1* | 10/2008 | Keller ................... H04L 67/322 455/404.1 |
| 2014/0355446 A1* | 12/2014 | Altman ............. H04W 28/0289 370/235 |
| 2015/0170507 A1* | 6/2015 | Ginter ..................... H04W 4/90 340/539.18 |
| 2018/0288224 A1* | 10/2018 | Dizengof ................ H04W 4/38 |
| 2019/0149661 A1* | 5/2019 | Klaban .............. H04M 7/0075 379/45 |
| 2021/0006960 A1* | 1/2021 | Martin ................ B60R 21/0134 |

* cited by examiner

Primary Examiner — Michael Y Mapa (57) ABSTRACT

Disclosed herein are devices, systems and methods for processing remotely at a remote server or cloud platform data relating to emergency communications (phone calls, text messages, etc.) received by Public Safety Answering Points (PSAPs), in particular emergency communications received and handled by emergency communication handling systems at the PSAP which support serial communication and have no network connectivity. To overcome this limitation, one or more serial-to-Internet Protocol (IP) gateways are deployed in the PSAP to: (a) receive the incident data from the emergency communication handling systems and encapsulate the incident data in its raw form in IP packets, and (b) transmit the IP packets to the remote processing system. The remote processing system then parses the incident data according to parsing rule(s) applicable for the PSAP from which the incident data is received, format the incident data and process the formatted data to optimize communication handling operation of the PSAPs.

20 Claims, 5 Drawing Sheets

CLOUD PROCESSING OF DATA RECEIVED BY SERIAL COMMUNICATION BASED PSAP EQUIPMENT

FIELD AND BACKGROUND OF THE INVENTION

The present invention, in some embodiments thereof, relates to processing incident data relating to incoming emergency communications (e.g. phone calls, text messages, etc.) received at one or more Public Safety Answering Points (PSAP), and, more specifically, but not exclusively, to processing, remotely at cloud based computing system(s), incident data relating to incoming emergency communications which is received by serial communication based handling equipment deployed in one or more PSAPs.

In order to simplify and expedite accesses to various emergency services, many countries have established joint emergency dispatch centers, for example, PSAPs and/or the like such as, for example, the 911 service (in the US), the 112 service (in Europe) which serve to receive incoming emergency calls relating to reports of any type of emergency event. Such joint emergency dispatch centers are typically manned by dispatchers trained to briefly interrogate the reporters and asses the emergency events to decide based on the emergency events which emergency service is best suitable to respond to each of the reported emergency events and route the incoming emergency calls to the respective emergency service accordingly.

One of the key factors in improving and optimizing the operation of the PSAPs is the ability to collect incident data relating to emergency calls and/or text messages such as, for example, Short Message Service (SMS) messages, and process the incident data to derive and/or extract insights, identify patterns and/or the like.

Moreover, processing the incident data and to generate an overall, wide and comprehensive view and presenting it to the dispatchers may significantly improve and enhance their handling and responding to the emergency events.

SUMMARY OF THE INVENTION

According to a first aspect of the present invention there is provided a system for processing remotely incident data relating to emergency communication received by Public Safety Answering Points (PSAPs), comprising one or more serial-to-Internet Protocol (IP) gateways deployed in one or more PSAPs and a remote server. The serial-to-IP gateway comprising one or more serial communication interfaces, and one or more network interfaces. The remote server comprising one or more network interfaces configured to connect to the serial-to-IP gateway via a network and one or more processors coupled to the one or more network interfaces. The one or more processors are configured for:

Receiving from the serial-to-IP gateway, via the network, one or more IP packets encapsulating raw incident data relating to one or more emergency communications received by the one or more PSAPs. The raw incident data is received by the serial-to-IP gateway from one or more emergency communication handling systems of the one or more PSAPs via the one or more serial communication interfaces.

Parsing the received raw incident data according to one or more parsing rules applicable for the one or more PSAPs.

Formatting the parsed incident data.

Processing the formatted incident data.

According to a second aspect of the present invention there is provided a computer implemented method of processing remotely incident data relating to emergency communication received by Public Safety Answering Points (PSAPs), comprising using one or more processors of a remote server for:

Receiving, via an Internet Protocol (IP) based network, one or more IP packets from one or more serial-to-IP gateways deployed in one or more PSAPs. The one or more IP packets encapsulating raw incident data relating to one or more emergency communications received by one or more of the PSAPs. The serial-to-IP gateway receives the raw incident data from one or more communication handling systems of one or more of the PSAPs via one or more serial communication channels.

Parsing the received raw incident data according to one or more parsing rules applicable for the one or more PSAPs.

Formatting the parsed incident data.

Processing the formatted incident data.

According to a third aspect of the present invention there is provided a computer program product comprising program instructions executable by a computer, which, when executed by the computer, cause the computer to perform a method according to the second aspect.

In a further implementation form of the first, second and/or third aspects, each of the one or more emergency communications comprises one or more of: an emergency phone call and an emergency Short Message Service (SMS) text message.

In a further implementation form of the first, second and/or third aspects, the remote server is a cloud based system.

In a further implementation form of the first, second and/or third aspects, the serial-to-IP gateway is configured to encrypt one or more of the IP packets.

In a further implementation form of the first, second and/or third aspects, the serial-to-IP gateway is configured to sign one or more of the IP packets.

In a further implementation form of the first, second and/or third aspects, the incident data includes one or more attributes of one or more of the emergency communications retrieved from one or more Automatic Number Identifier (ANI) Automatic Location Identification (ALI) databases.

In a further implementation form of the first, second and/or third aspects, one or more of the parsing rules are predefined.

In a further implementation form of the first, second and/or third aspects, one or more of the parsing rules are learned using one or more machine learning mode trained with a plurality of incident data datasets received from a plurality of PSAPs.

In a further implementation form of the first, second and/or third aspects, the parsed incident data is formatted according to one or more predefined formatting rules.

In an optional implementation form of the first, second and/or third aspects, real-time information relating to the one or more emergency communication is collected by communicating with one or more originating client devices from which one or more of the emergency communications are initiated. The real-time information comprises one or more members of a group consisting of: a location of the respective originating client device identified by one or more location sensor of the respective originating client device, one or more image of a surrounding of the respective originating client device captured by one or more imaging sensor of the respective originating client device, and an audio playback captured by one or more audio sensor of the respective originating client device.

In an optional implementation form of the first, second and/or third aspects, advanced information relating to one or more of the originating client devices is obtained by communicating with one or more networked resources.

In a further implementation form of the first, second and/or third aspects, the processing of the formatted incident data further comprises processing the real-time information and/or the advanced information collected for one or more of the emergency communications in correlation with the incident data of the one or more emergency communications.

In a further implementation form of the first, second and/or third aspects, the processing of the formatted incident data comprises generating information relating to one or more of the emergency communications for presentation to one or more dispatchers of one or more of the PSAPs via one or more computer displays.

In a further implementation form of the first, second and/or third aspects, the processing of the formatted incident data comprises generating one or more activation flows for transferring data to one or more of the dispatchers from one or more of:

One or more originating client devices from which one or more of the emergency communications are initiated.

One or more networked resources configured to provide advanced information relating to one or more of the originating client devices.

In a further implementation form of the first, second and/or third aspects, the processing of the formatted incident data comprises generating, in real-time, instructions for optimizing call taking of one or more additional incoming emergency communications received by one or more of the PSAPs.

In a further implementation form of the first, second and/or third aspects, the processing of the formatted incident data comprises computing analytics data based on analysis of incident data of a plurality of emergency communications received by one or more of the PSAPs.

In a further implementation form of the first, second and/or third aspects, the serial-to-IP gateway further includes one or more local network interfaces configured to connect to one or more local networks for communicating with one or more emergency communication management systems. The serial-to-IP gateway is further configured to:

Receive, via the local network, one or more local IP packets from one or more of the emergency communication management system. The one or more local IP packet encapsulate additional information relating to one or more of the emergency communication according to one or more emergency data exchange protocols.

Transmit the one or more local IP packets to the remote server.

In a further implementation form of the first, second and/or third aspects, each of the one or more emergency data exchange protocols is a member of a group consisting of: an Emergency Incident Data Document (EIDO) and an Emergency Incident Data Document (EIDD).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 3 is a schematic illustration of an exemplary raw data ANI-ALI message.

DESCRIPTION OF SPECIFIC EMBODIMENTS OF THE INVENTION

The present invention, in some embodiments thereof, relates to processing incident data relating to incoming emergency communications (e.g. phone calls, text messages, etc.) received at one or more PSAPs, and, more specifically, but not exclusively, to processing, remotely at cloud based computing system(s), incident data relating to incoming emergency communications which is received by serial communication based handling equipment deployed in one or more PSAPs.

Processing incident data relating to incoming emergency communications (e.g. phone calls, text messages, etc.) received at one or more PSAPs may be highly desirable for a plurality of goals and/or objectives, for example, for optimizing, specifically real-time optimization of the PSAP operation, generating analytics characterizing the incoming emergency communications and/or the PSAP operation, generating a comprehensive view for the dispatchers stationed at the PSAP and/or the like.

In particular, processing the incident data may be highly effective and efficient when done using cloud based computing systems, services, platforms and infrastructures (collectively designated cloud based systems herein after) which are rapidly and constantly evolving. These cloud based computing systems may deliver unparalleled computing resources (e.g. processing power, storage resources, network resources, etc.), flexible connectivity to practically any other system, service and/or application, remote user accessibility and much more.

However, while the cloud based computing systems are typically connected to Internet Protocol (IP) based networks and communicate using IP based protocols, some of the equipment and/or systems deployed in the PSAPs, for example, communication handling systems (e.g. call handling systems, text message handling systems, etc.) and/or the like may be legacy systems which are incapable of connecting to IP based networks. Such legacy communication handling systems may typically communicate via serial communication channels according to one or more serial communication protocols, for example, RS-232, RS-422, RS-485 and/or the like. This incompatibility in the communication capabilities between the cloud based computing systems and the emergency data processing systems may prevent direct communication between the two entities thus may thus prevent processing of the incident data at the cloud.

According to some embodiments of the present invention, there are provided methods, systems and computer program products for delivering incident data relating to incoming emergency communications received at one or more PSAPs to one or more remote systems, in particular cloud based computing systems which may process the incident data according to one or more processing nodes for one or more of a plurality of goals and/or objectives.

One or more emergency communications, for example, a phone call, a text message (e.g. Short Message Service (SMS), etc.) and/or the like may be initiated by one or more users (reporters) using respective (originating) client devices, for example, a landline telephone, a cellular phone, a Smartphone, a tablet, a computer, a laptop and/or the like to the one or more PSAPs to report of potential emergency events which may span a wide range of events including potentially high threat and dangerous events, for example, a fire, gunfire, a fight, a rape, a kidnap, a car accident and/or the like as well as low severity events, for example, a water pipe rapture, public property vandalism, a lost pet and/or the like.

The emergency communications may be typically received by one or more communication handling systems, for example, a call handling system, a text message handling system and/or the like configured to receive and handle such incoming emergency communications.

Since the communication handling system(s) may typically provide serial communication connectivity, one or more serial-to-IP gateways may be deployed at one or more of the PSAPs to connect to the communication handling system(s) of the respective PSAP via one or more serial communication channels supported by the communication handling system(s), for example, RS-323, RS-422, RS-485 and/or the like. The serial-to-IP gateway may communicate with the communication handling system(s) over the serial communication channels and may receive the incident data relating to the emergency communications which is generated, collected and/or obtained by the communication handling system(s).

The incident data relating to each emergency communication may include data and information attributes extracted from the respective emergency communication, for example, a phone number of the originating client device from which the respective emergency communication is received, a type of the reported emergency event, a location of the reported emergency event, a location of the reporter (user), details of the emergency event, timing parameters of the respective emergency communication and/or the like.

However, the incident data relating to one or more of the emergency communications may further may also include one or more attributes received by the communication handling system(s) from one or more onsite and/or offsite systems and/or services such as, for example, an Automatic Number Identifier (ANI) Automatic Location Identification (ALI) database and/or service. Such attributes may include, for example, an address of an originating landline phone (if applicable), a location of an originating cellular phone (if applicable) based on the location of receiving cellular base station(s) (e.g. triangulation, location extracted from the client device, etc.) and/or the like.

Moreover, the incident data relating to one or more of the emergency communications may also include one or more attributes collected by the communication handling system(s) at the PSAP, for example, a dispatcher post where the respective emergency communication was received, a name of the dispatcher who received the respective emergency communication, a number of dispatcher posts currently active at the PSAP, a number of dispatchers currently available at the PSAP and/or the like.

The serial-to-IP gateway may pack, i.e., encapsulate the incident data received from the communication handling system(s) in one or more IP packets according to one or more IP protocols, for example, User Datagram Protocol (UDP), Transmission Control Protocol (TCP) and/or the like. In particular, the serial-to-IP gateway may encapsulate the received incident data in its raw form, i.e., with no manipulation, processing and/or adjustment of the incident data. This means that the incident data is simply packed in the IP packets(s), for example in the data payload(s) of the IP packet(s).

The serial-to-IP gateway which is connected to one or more networks may communicate with the remote processing system, for example, the cloud based computing system and may transmit, over the IP based network(s), the IP packet(s) containing the raw incident data as received by the serial-to-IP gateway from the communication handling system(s) via the serial communication channel(s).

Optionally, the serial-to-IP gateway encrypts the raw incident data transmitted in the IP packet(s) using one or more encryption algorithms as known in the art to increase security, safety and/or privacy of the incident data. Moreover, the serial-to-IP gateway may sign one or more of the IP packet(s) using one or more signature and/or authentication algorithms as known in the art to enable verification of the serial-to-IP gateway as the originator of the IP packet(s).

The remote processing system, for example, the cloud based computing system may extract the raw incident data from the IP packet(s) received from the serial-to-IP gateway and may parse the incident data according to one or more parsing rules to properly identify and extract the attributes of the emergency communication(s) included in the incident data. One or more of the parsing rules may be predefined. However, one or more of the parsing rules may be learned using one or more Machine Learning (ML) models, for example, a neural network, a Support Vector Machine (SVM) and/or the like trained with a plurality of incident data datasets received from a plurality of PSAPs. The ML model(s) may be trained to automatically identify attribute fields in the incident data structures and may be then applied to identify and parse newly received (never previously seen) incident data structures received from the serial-to-IP gateway.

The cloud based computing system may further format the parsed incident data according to one or more formatting rules in order to establish common, standard and easy to use data structure of the incident data such that the formatted incident data may be distributed between a plurality of systems, services and/or platforms all conforming to the common data format and thus capable of properly extracting the attributes.

The cloud based computing system may then process the received raw incident data relating to the emergency communications received at the PSAP. The cloud based computing system may process the incident data in a plurality of modes for a plurality of goals and objectives. For example, the cloud based computing system may process the formatted incident data to generate, in real-time, instructions for optimizing call taking of one or more additional incoming emergency communications, specifically incoming emergency calls received at one or more of the PSAPs. In another example, the cloud based computing system may process the formatted incident data to compute analytics data based on analysis of the incident data of a plurality of emergency communications received by one or more of the PSAPs.

Optionally, the cloud based computing system may establish a communication session with one or more of the originating client devices from which one or more of the emergency communications (call and/or text message) are initiated in order to acquire and/or collect additional information relating to the respective emergency communication. The additional information acquired from the originating client device may include real-time information, for example, geolocation data of the originating client device identified in real-time by one or more location sensors of the originating client device, imagery data (image, video, etc.) captured in real-time by one or more imaging sensor of the originating client device, audio data captured in real-time by one or more audio sensors of the originating client device and/or the like. The additional information acquired from the originating client device may further include identification data relating to the user using the originating client device, for example, an age, a gender, a name, a residence address, indication of whether the user is involved in the emergency event and/or the like.

Optionally, the cloud based computing system may communicate with one or more networked resources to obtained advanced information relating to one or more of the originating client device from which one or more of the emergency communications are initiated, for example, an Advanced Mobile Location (AML) service configured to provide real-time geolocation of one or more of the originating client devices.

The cloud based computing system may therefore further process the additional and/or the advanced incident data correlating to the incident data received from the communication handling system(s) via the serial-to-IP gateway(s).

For example, the cloud based computing system may process the formatted incident data to generate one or more activation flows between one or more of the dispatchers stationed at one or more of the PSAPs and one or more remote sources, for example, an activation flow may be generated between one of the dispatchers and one of the originating client device, an activation flow may be generated between one of the dispatchers and one of the networked resources configured to provide the advanced information and/or the like. In another example, the cloud based computing system may process the formatted incident data optionally comprising the additional and/or advanced information to generate information relating to one or more of the emergency communications for presentation to one or more of the dispatchers via one or more computer displays.

Remotely processing, in particular at cloud based processing systems, incident data relating to emergency communications (call, text, etc.) received at the PSAPs and delivered in IP packets encapsulating the incident data in its raw from as received from the communication handling system(s) deployed in the PSAP(s) may present significant advantages and benefits compared to currently existing systems and methods for processing incident data of incoming emergency communications.

First, some of the existing systems may be deployed in one or more of the PSAPs to locally process the incident data. Such deployment may be highly complex and/or costly since separate processing resources (systems, servers, etc.) may be deployed in each PSAP requiring independent installation, maintenance, update and/or the like. Processing the incident data in a unified remote processing system, specifically in the cloud based processing system may significantly reduce the complexity and the deployment cost since the centralized cloud based processing system may serve to process the incident data received from a plurality of PSAPs with no need to deploy any processing resources for separately processing the incident data of each PSAP.

Moreover, since the cloud based processing system may process the incident data received from a plurality of PSAPs, higher level processing may be applied, for example, monitoring and/or controlling, in real-time, a plurality of emergency communications received at multiple PSAPs, computing analytics over multiple PSAPs which may be of high benefit to identify patterns in the PSAPs operation which may be used to improve, optimize and/or increase efficiency of one or more of the PSAPs.

Furthermore, since at least some of the processes incident data is acquired and/or received from other networked resources, the cloud based processing system may communicate with these networked resources to acquire incident data relating to emergency communications received at a plurality of PSAPs which may be significantly more effective, cheaper and reduced network bandwidth compared to a plurality of processing systems each deployed in a respective PSAP which may need to each communicate independently with the networked resources.

However, as stated herein before, processing the incident data remotely, for example, at the cloud, may require deploying a gateway at each PSAP to convert the incident data received via serial communication based legacy communication handling systems to IP based communication which may be transmitted to the remote cloud based processing system. Some of the existing methods and systems may use one or more local (smart) gateways deployed at one or more of the PSAPs which may be configured to communicate via serial communication channel(s) with the with the legacy communication handling system(s) to receive the incident data. Each local gateway which is connected to one or more IP based networks, may be further configured to parse and format the incident data serially received from the communication handling system(s) according to parsing and/or formatting instructions received from one or more remote network nodes, for example, a remote management system. The local gateway may then transit and/or distribute the formatted incident data to one or more network nodes for further processing.

The local "smart" gateways may present, however, some major limitations which are overcome by the serial-to-IP gateway deployed in the PSAPs to deliver the serially received incident data to the remote processing system, specifically to the cloud based processing system.

First, the local "smart" gateway which needs to be deployed in each PSAP may require significant computing resources (processing resources, processing time, storage resources, etc.) to parse and format the incident data which may significantly increase the unit cost, deployment cost and/or maintenance cost of this solution. The serial-to-IP gateway, on the other hand, may be a very simple, low cost and easy to deploy device since it is only configured to encapsulate the incident data, in its raw from, in IP packets with no further manipulation, adjustment and/or processing.

Moreover, the local "smart" gateway may need to store a plurality of parsing and/or formatting instructions and/or rules since they may change between different PSAPs thus requiring extensive storage resources at the local gateway and further increasing its complexity and/or cost. In addition, in case of a change in the structure of the incident data generated and/or collected by the communication handling system(s) in one or more of the PSAPs, new and/or updated parsing and/or formatting instructions and rules must be transmitted to the local gateway thus further increasing the maintenance effort and/or cost for keeping the local gateways up to date. This is in contrast to the serial-to-IP gateway which does not apply parsing, formatting and/or processing of any type on the incident data but rather transmits the raw incident data encapsulated in IP packets thus requiring very little computing and storage resources as well as very minimal and typically no maintenance since there is no need to update any parsing and/or formatting instructions and rules. Any inconsistencies of the incident data structures between PSAPs as well as changes applied in these structures may be handled in the raw incident data by the unified cloud based processing system having major processing resources in abundance.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
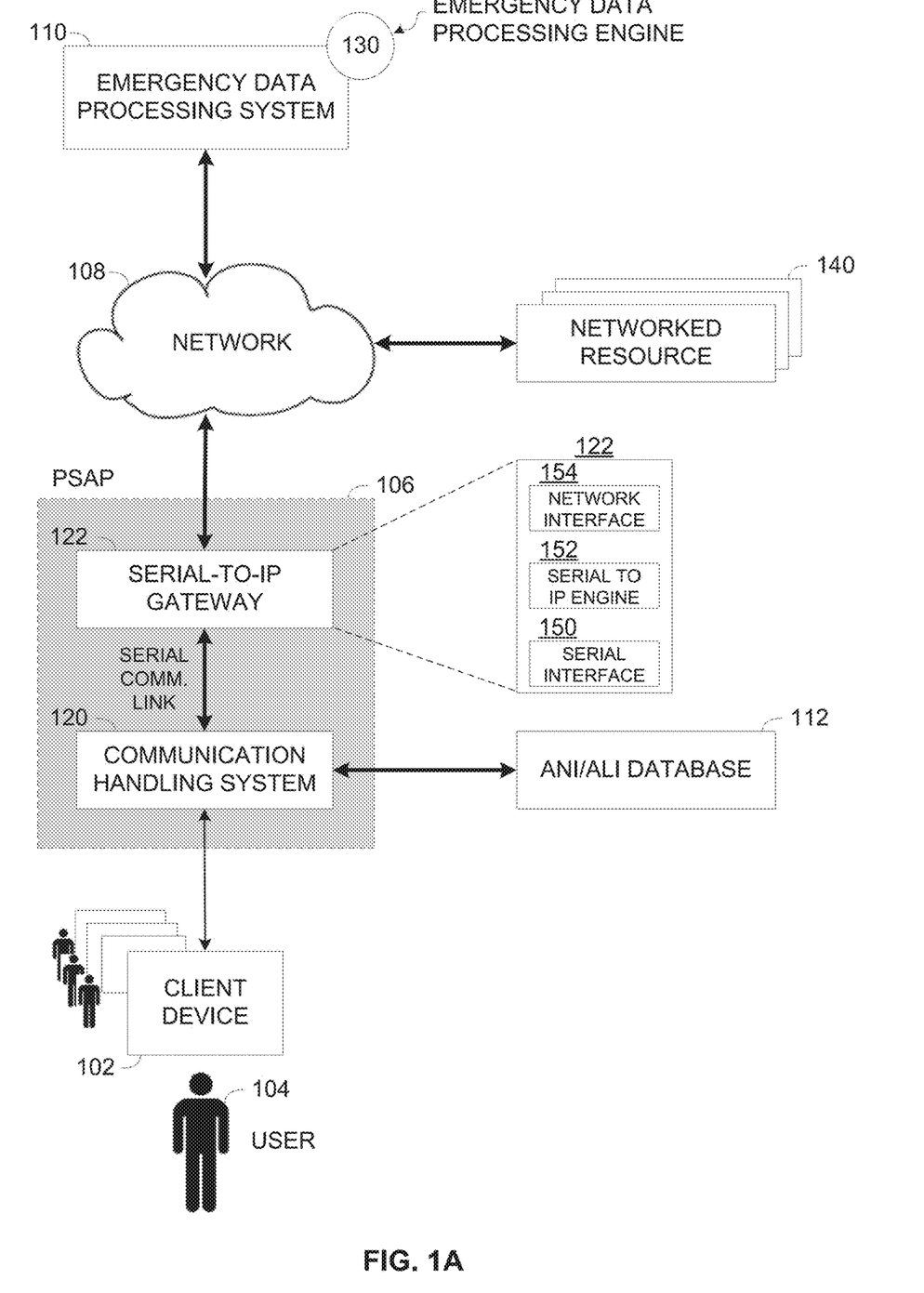
FIG. 1A and FIG. 1B are schematic illustrations of an exemplary system for processing remotely emergency communication data delivered by a serial gateway after received by serial communication based PSAP equipment, according to some embodiments of the present invention.
Figure 1B:
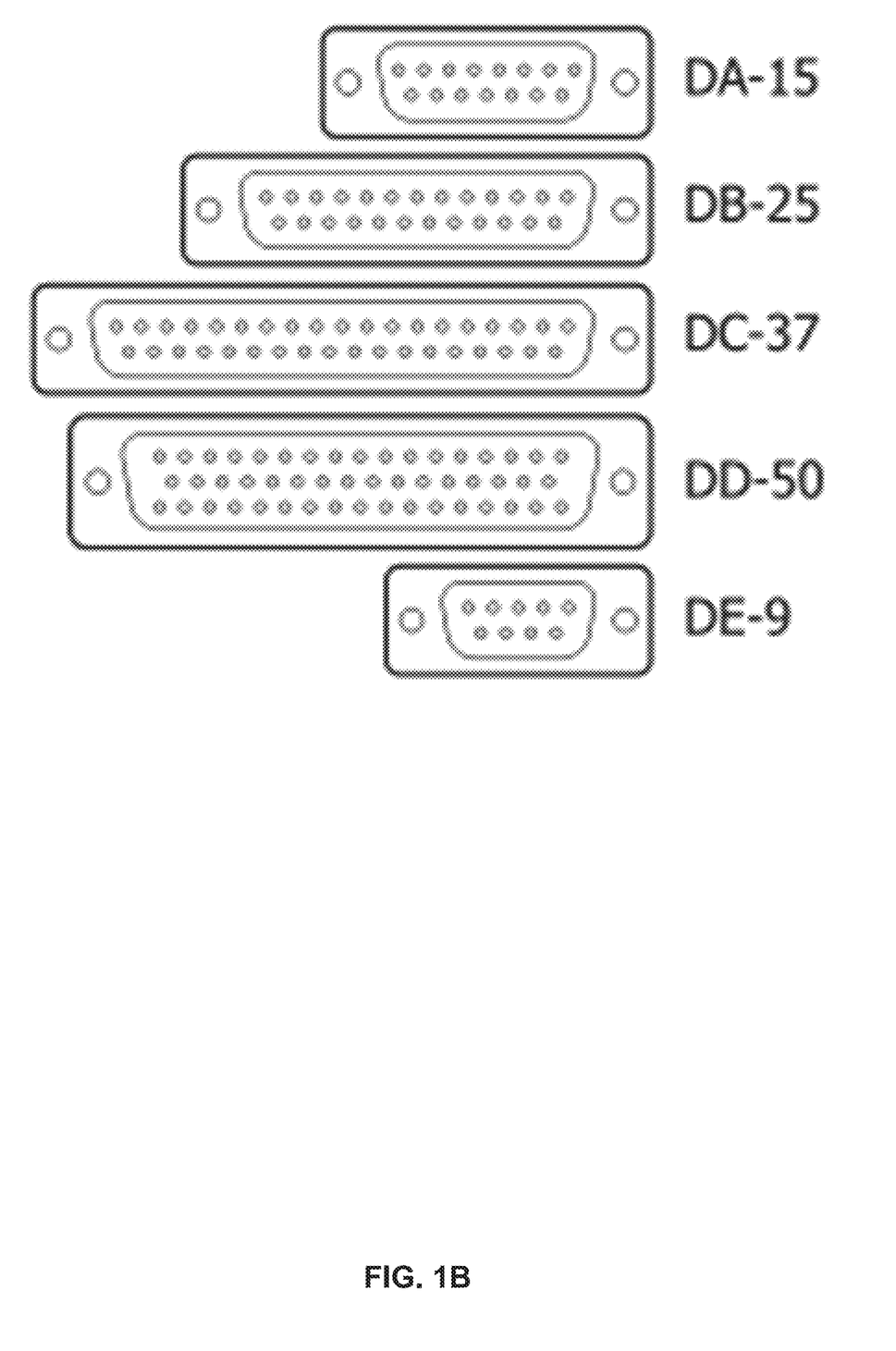

Referring now to the drawings, FIG. 1A and FIG. 1B are schematic illustrations of an exemplary system for processing remotely emergency communication data delivered by a serial gateway after received by serial communication based PSAP equipment, according to some embodiments of the present invention.

As seen in FIG. 1A, one or more client devices 102, for example, a landline telephone, a Smartphone, a tablet, a wearable device, a computer, a laptop and/or the like may be used by one or more users (reporters) 104 to report of one or more potential emergency events by initiating emergency communication, for example, a phone call, a text message and/or the like to one or more dispatch centers, in particular one or more PSAPs 106.

As common in PSAPs around the world, the emergency events reported by the user 104 may span a wide range of events including potentially high threat and dangerous events, for example, a fire, gunfire, a fight, a rape, a kidnap, a car accident and/or the like as well as low severity events, for example, a water pipe rapture, public property vandalism, a lost pet and/or the like.

The incoming emergency communications received from the client devices 102 may be typically received by one or more communication handling systems 120 deployed in the PSAP 106 and configured to receive and handle the incoming emergency communication. For example, one or more of the communication handling system 120 may be configured to receive and handle incoming phone calls originating and/or delivered according to one or more standards and/or protocols, for example, originating from landline phones and/or cellular phones, received via one or more public switched telephone networks (PSTN), delivered via IP systems and/or the like. In another example, one or more of the communication handling systems 120 may be configured to receive and handle incoming text messages, for example, a Short Message Service (SMS) text message and/or the like.

The communication handling system(s) 120 may collect, for example, fetch, extract and/or otherwise obtain the incident data relating to each emergency communication received at the PSAP 106, whether it is a phone call or a text message.

One or more systems deployed in the PSAP 106 may further communicate with one or more other onsite and/or offsite systems and/or services to obtains and/or collect at least some of the incident data relating to one or more of the emergency communication received at the PSAP 106, for example, an ANI/ALI database (service) 114 provided by one or more phone service providers as known in the art. Communication equipment, methods and/or protocols for communicating with the ANI/ALI database 114 are known in the art and are out of scope of this disclosure. For brevity, the communication handling system 120 is described to directly communicate with the ANI/ALI database 114. However, as would be evident for a person skilled in the art the exact deployment and connection between the communication handling system 120 and the ANI/ALI database 114 may be different and include additional elements (not shown in FIGS. 1A-B) as known in the art.

The incident data relating to the emergency communications received at the PSAP 106 may be transferred to one or more remote emergency data processing systems 110 configured to process the incident data. In particular, the incident data may be transferred to the emergency data processing system(s) 110 via a network 108 comprising one or more wired and/or wireless networks, for example, a Local Area Network (LAN), a Wireless LAN (WLAN), a Wide Area Network (WAN), a Municipal Area Network (MAN), a telephone network, a cellular network, the internet and/or the like.

However, while the emergency data processing system(s) 110 are connected to the network 108 and typically communicates with other network nodes according to IP based protocols, some of the equipment and/or systems deployed in the PSAP 106, for example, the communication handling system 120 may be legacy systems which are incapable of connecting to IP based networks. Such legacy communication handling system(s) 120 may communicate with other systems via one or more serial communication channels according to one or more serial communication protocols, for example, RS-232, RS-422, RS-485 and/or the like. The incompatibility in the communication capabilities between the communication handling system(s) 120 and the emergency data processing system(s) 110 may prevent direct communication between the two entities.

To overcome this limitation one or more serial-to-IP gateways 122 may be deployed in the PSAP 106. The serial-to-IP gateway 122 may be configured to receive data, for example, the incident data via the serial communication channel(s) from one or more other systems, for example, the communication handling system(s) 120, encapsulate the received incident data in one or more IP packets and transmit the IP packet(s) to the emergency data processing system(s) 110 via a network 108. In particular, the serial-to-IP gateway 122 may encapsulate the received incident data in its raw form, i.e., with no manipulation, processing and/or adjustment of the incident data. This means that the incident data is simply packed in data payload(s) of the IP packet(s) and transmitted via the network 108 to the emergency data processing system(s) 110.

The serial-to-IP gateway 122 may include a serial interface 150, a serial-to-IP engine 152 and a network interface 154. The serial interface 150 may include one or more serial communication interfaces, for example, an RS-232 interface, an RS-422 interface, an RS-485 interface and/or the like for connecting to one or more serial communication channels and communicate with one or more other serial nodes connected to the serial communication channel(s), for example, the communication handling system(s) 120 deployed in the PSAP 106.

The serial interface 150 may include one or more connector types with various pin arrangements as known in the art for connecting to one or more of the serial communication channel(s), specifically the serial channel(s) connecting to the communication handling system(s) 120. One or more of the connector(s) of the serial interface 150 may include, for example, D-Sub connectors as seen in FIG. 1B, for example, DA-15 (15 pins), DB-25 (25 pins), DC-37 (37 pins), DD-50 (50 pins), DE-9 (9 pins) and/or the like which are typically used for serial communication cabling.

The serial-to-IP engine 152 may pack and/or encapsulate serial data received via the serial interface 150 in one or more IP packets according got one or more IP protocols, for example, User Datagram Protocol (UDP), Transmission Control Protocol (TCP) and/or the like. Specifically, the serial-to-IP engine 152 may encapsulate the incident data received from the communication handling system(s) 120 in one or more of the IP packets.

The serial-to-IP engine 152 may be implemented using one or more architectures, implementation and/or designs. For example, the serial-to-IP engine 152 may be implemented using one or more processor(s) available in the serial-to-IP gateway 122. The processor(s), homogenous or heterogeneous, may include one or more processing nodes and/or cores arranged for parallel processing, as clusters and/or as one or more multi core processor(s). The processor(s) may execute one or more software modules such as, for example, a process, a script, an application, an agent, a utility, a tool and/or the like each comprising a plurality of program instructions stored in a non-transitory medium (program store), for example, a storage comprising one or more non-transitory persistent storage devices, for example, a Read Only Memory (ROM), a Flash array, a Solid State Drive (SSD), a hard drive (HDD) and/or the like. The storage may also include one or more volatile devices, for example, a Random Access Memory (RAM) component, a cache and/or the like. In another example, the serial-to-IP engine 152 may be implemented using one or more hardware elements integrated in the serial-to-IP gateway 122, for example, a circuit, a component, an Integrated Circuit (IC), an Application Specific Integrated Circuit (ASIC), a Field Programmable Gate Array (FPGA), a Digital Signals Processor (DSP), a network processor and/or the like. In another example, the serial-to-IP engine 152 may be implemented by a combination of one or more software modules executed by the processor(s) and one or more of the hardware elements.

The network interface 154 may include one or more network interfaces for connecting to the network 108, for example, a LAN interface, a WLAN interface, a WAN interface, cellular interface and/or the like.

The emergency data processing system 110, for example, a server, a computing node, a cluster of computing nodes and/or the like may include one or more processors, homogenous or heterogeneous, which may include one or more processing nodes and/or cores arranged for parallel processing, as clusters and/or as one or more multi core processor(s). The processor(s) may execute one or more software modules such as, for example, a process, a script, an application, an agent, a utility, a tool and/or the like each comprising a plurality of program instructions stored in a non-transitory medium (program store), for example, a storage of the emergency data processing system 110. The storage may include one or more non-transitory persistent storage devices, for example, a ROM, a Flash array, an SSD, an HDD and/or the like. The storage may also include one or more volatile devices, for example, a RAM component, a cache and/or the like. The storage may further include one or more networked storage resources, for example, a Network Attachable Storage (NAS), a storage server, a storage cloud service and/or the like.

The processor(s) of the emergency data processing systems 110 be further support by one or more hardware elements available to the emergency data processing systems 110, for example, a circuit, a component, an IC, an ASIC, an FPGA, a DSP, a network processor and/or the like.

The emergency data processing system 110 may therefore execute one or more functional modules, for example, an emergency data processing engine 130 implemented by one or more software modules, one or more of the hardware elements and/or a combination thereof.

Optionally, the emergency data processing system 110, specifically, the emergency data processing engine 130 may be implemented as one or more cloud based computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

The emergency data processing systems 110 may further communicate with one or more network resources 140 via the network 108, for example, an Advanced Mobile Location (AML) service and/or the like. Specifically the emergency data processing system 110 may communicate with the network resource(s) 140 after receiving the incident data from the incident data from the serial-to-IP gateway 122. The emergency data processing systems 110 may extract one or more attributes of the originating client device 102 and/or of the reporting user 104 and may communicate with the network resource(s) 140 to collect additional information relating to these extracted attribute(s).

Figure 2:
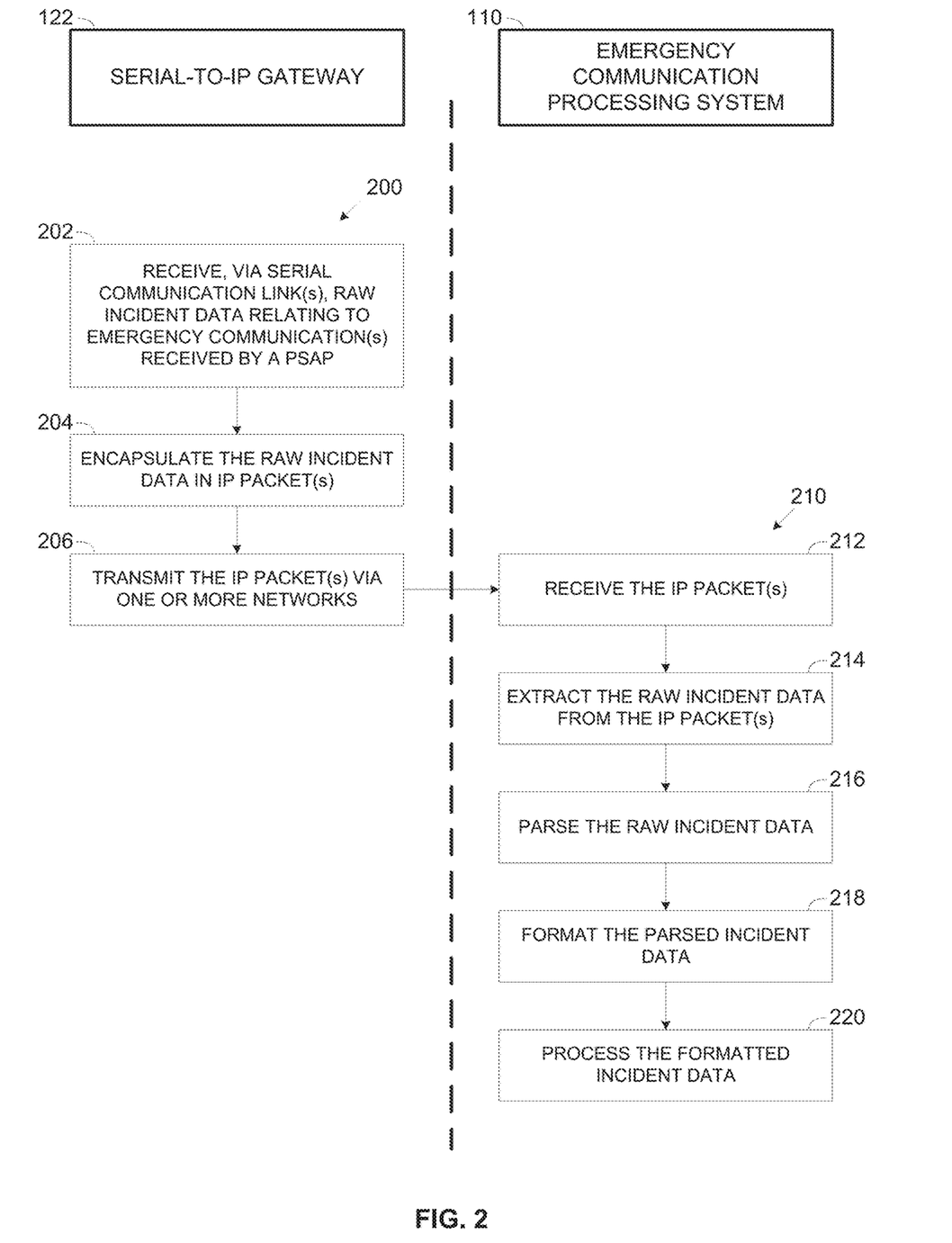
FIG. 2 presents flowcharts of exemplary processes executed for processing, at a remote server, emergency communication data delivered by a serial gateway after received by serial communication based PSAP equipment, according to some embodiments of the present invention.

Reference is now made to FIG. 2, which presents flowcharts of exemplary processes executed for processing, at a remote server, emergency communication data delivered by a serial gateway after received by serial communication based PSAP equipment, according to some embodiments of the present invention.

An exemplary process 200 may be executed by a serial-to-IP gateway such as the serial-to-IP gateway 122 for receiving, from one or more communication handling systems such as the communication handling system 120 raw incident data relating to one or more emergency communications (calls and text messages) received at a PSAP such as the PSAP 106, encapsulating the raw incident data in one or more IP packets and transmitting the IP packets via a network such as the network 108 to one or more remote emergency data processing systems such as the emergency data processing system 110.

An exemplary process 210 may be executed by the emergency data processing system 110 for arranging and formatting the raw incident data extracted from the IP packet(s) received from the serial-to-IP gateway 122 and processing the formatted incident data.

The processes 200 and 210 are presented for a single PSAP 106 deployed with a single communication handling system 120 and a single serial-to-IP gateway 122 which communicates via the network 108 with a single emergency data processing system 110. This, however, should not be construed as limiting since the processes, specifically the process 210 may be expanded for a plurality of serial-to-IP gateways 122 deployed in a plurality of PSAPs such as the PSAP 106. Moreover, one or more serial-to-IP gateways 122 may be deployed in one or more of the PSAPs 106 to receive incident data from a plurality of communication handling systems 120.

As shown at 202, the process 200 starts with the serial-to-IP gateway 122 receiving incident data relating to one or more emergency communications received at the PSAP 106.

As described herein before, the serial-to-IP gateway 122 may receive the incident data from the communication handling system(s) 120 deployed in the PSAP 106 which are configured to collect, for example, fetch, extract and/or otherwise obtain the incident data relating to the emergency communication(s), whether a phone call or a text message, received at the PSAP 106.

The serial-to-IP gateway 122 may receive the incident data from the communication handling system(s) 120 via a serial interface such as the serial interface 150 connected to one or more of the serial communication channels, for example, the RS-232 channel, the RS-422 channel, the RS-485 channel and/or the like connecting the communication handling system 120 to the serial-to-IP gateway 122.

The incident data relating to each incoming emergency communication may include one or more attributes extracted, for example, by the communication handling system(s) 120, from the respective emergency communication, for example, a phone number of an originating client device 102 from which the respective emergency communication is received, a type of the reported emergency event, a location of the reported emergency event, a location of the reporting user 104, details of the emergency event (e.g. casualties, wounded, involved parties, etc.), timing parameters of the respective emergency communication (e.g. start time, end time, duration, etc.) and/or the like.

The incident data relating to one or more of the emergency communications may further include one or more attributes collected, for example, by the communication handling system(s) 120, at the PSAP 106, for example, a dispatcher post where the respective emergency communication was received, a name of the dispatched who received the respective emergency communication, a number of dispatcher posts currently active at the PSAP 106, a number of dispatchers currently available at the PSAP 106 and/or the like.

The incident data relating to one or more of the emergency communications may further include one or more attributes received, for example, by the communication handling system(s) 120, from the onsite and/or offsite system(s) and/or service(s) such as, for example, the ANI/ALI database 114, for example, an address of the originating landline phone (if applicable), a location of the originating cellular phone (if applicable) based on the location of receiving cellular base station(s) (e.g. triangulation, etc.) and/or the like.

The incident data received by the serial-to-IP gateways from the communication handling system(s) 120 may be received in its raw from as generated by the communication handling system(s) 120. The raw incident data relating to each emergency communication may include one or more of the attributes of the respective emergency communication arranged, for example, by the communication handling system(s) 120, in one or more fields according to one or more data arrangement rules, conventions and/or definitions applied at the PSAP 106.

Reference is now made to FIG. 3, which is a schematic illustration of an exemplary raw data ANI-ALI message. An exemplary data block 300 includes at least part of incident data of a certain emergency communication, for example, an incoming emergency phone call. As seen the raw incident data 300 presented in HEX format may include one or more of the attributes identified for the certain emergency communication, for example, a phone number (including area code), a service provider, and other attributes extracted from the certain emergency communication, collected at the PSAP 106, retrieved from the ANI/Ali database 114 and/or the like.

Reference is made once again to FIG. 2.

As shown at 204, the serial-to-IP gateway 122 employing a serial-to-IP engine such as the serial-to-IP engine 152 may encapsulate the serially received incident data in one or more IP based packets created and formatted according to one or more IP communication protocols, for example, UDP, TCP and/or the like.

The serial-to-IP gateway 122 may encapsulate the incident data in its raw from, meaning that the serial-to-IP gateway 122 applies no manipulation, processing and/or adjustment to the incident data but rather simply packs the raw incident data, as received from the communication handling system(s) 120, in the created IP packet(s), specifically in the payload(s) of the IP packet(s).

As shown at 206, the serial-to-IP gateway 122 may transmit the IP packet(s) to the emergency data processing system 110 via a network interface such as the network interface 154 connected to the network 108.

Optionally, before transmitting one or more of the IP packet(s), the serial-to-IP gateway 122 encrypts one or more of the IP packets according to one or more encryption protocols, for example, Transport Layer Security (TLS), Secure Sockets Layer (SSL), Message Authentication Code (MAC), a private/public key encryption, a symmetric key encryption and/or the like to increase security, safety and/or privacy of the incident data transmitted via the network 108.

Optionally, before transmitting one or more of the IP packet(s), the serial-to-IP gateway 122 signs one or more of the IP packets according to one or more authentication protocols, for example, Message Authentication Code (MAC), private/public authentication key and/or the like to publish the source (origin) of the IP packet(s) to the receiving party(s), for example, the emergency data processing system 110, specifically the emergency data processing engine 130.

Optionally, the serial-to-IP gateway 122 further includes one or more local network interfaces connected to one or more local networks for communicating with one or more emergency communication management systems using one or more IP based communication networks and/or protocols. In such embodiments, the serial-to-IP gateway 122 may be configured to receive one or more local IP packets transmitted by one or more of the IP based emergency communication management system via the local network(s). The local IP packet(s) may encapsulate additional information collected, generated and/or otherwise obtained by the emergency communication management system(s) in relation to one or more of the emergency communications received at the PSAP 106. The additional information may be encapsulated in the local IP packet(s) according to one or more emergency data exchange protocol, for example, an Emergency Incident Data Document (EIDO), an Emergency Incident Data Document (EIDD) and/or the like. The serial-to-IP gateway 122 may then forward, i.e., transmit the local IP packet(s) to the emergency data processing engine 130 via the network 108.

As shown at 212, the process 210 starts with the emergency data processing system 110, specifically the emergency data processing engine 130 receiving, from the serial-to-IP gateway 122 via the network 108, the IP packet(s) encapsulating the incident data relating to one or more of the emergency communications received at the PSAP 106.

As shown at 214, the emergency data processing engine 130 may extract the raw incident data from the received IP packet(s).

As shown at 216, the emergency data processing engine 130 may parse the raw incident data according to one or more parsing rules applicable for the PSAP 106. The parsing rules may define the attribute fields, for example, location, order, size and/or the like of the fields in the data structure of the incident data relating to a respective emergency communication which hold the attributes of the respective emergency communication.

One or more of the parsing rules may be predefined. For example, one or more of the parsing rules applicable for a certain PSAP 106 may define the order, size and/or location within the incident data's structure of a plurality of attribute fields relating to each emergency communication.

However, one or more of the parsing rules may be learned using one or more ML models, for example, a neural network, an SVM and/or the like trained with a plurality of incident data datasets received from a plurality of PSAPs such as the PSAP 106. The ML model(s) may be trained to automatically identify attribute fields in the incident data structures and may be then applied to identify and parse newly received (never previously seen) incident data structures received from the serial-to-IP gateway 122.

Figure 4:
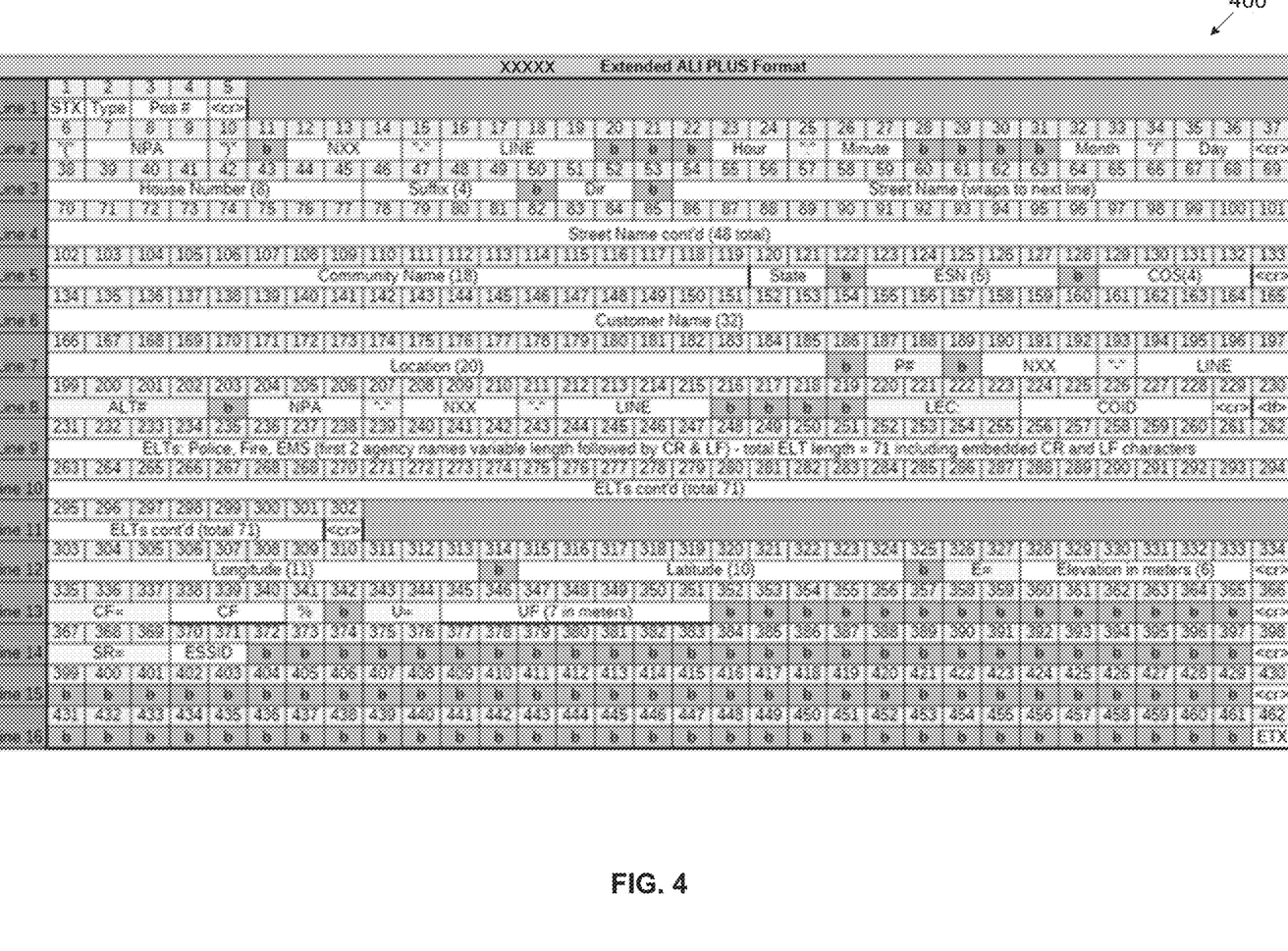
FIG. 4 is a schematic illustration of an exemplary parsing rule table, according to some embodiments of the present invention.

Reference is now made to FIG. 4, which is a schematic illustration of an exemplary parsing rule table, according to some embodiments of the present invention. An exemplary ANI-ALI message layout 400 relating to a certain emergency communication, for example, an incoming emergency (phone) call may include a plurality of attribute fields as known in the art each comprising one of the plurality of attributes extracted, collected and/or received for the respective incoming emergency call. The attribute fields may define, for example, timing attributes of the respective incoming emergency call (e.g., hour, minute, month, day, etc.), location attributes (e.g. house number, street name, etc.), Event Liaison Team (ELT) attributes (e.g. Police, Fire, EMS, etc.) and/or the like.

Reference is made once again to FIG. 2.

As shown at 218, the emergency data processing engine 130 may format the parsed incident data, specifically the attributes relating to the emergency communication(s) according to one or more formatting rules. Each formatting rule may define one or more structural parameters for arranging the incident data in one or more data structures, for example, for arranging the attributes in fields. The structural parameters defining the fields may include, for example, a field location, a filed size, fields order, field content (attribute), field name and/or the like. The formatting rule(s) may be predefined to establish a common, standard and easy to use data structure of the incident data such that the formatted incident data may be distributed between a plurality of systems, services and/or platforms such as the emergency data processing engine 130 all conforming to the common data format and thus capable of properly extracting the attributes.

As shown at 220, the emergency data processing engine 130 may process the incident data relating to one or more of the emergency communications, for example, the phone calls and/or the text messages (e.g., SMS messages).

Optionally, the emergency data processing engine 130 may establish a communication session with one or more originating client devices 102 from which one or more of the emergency communications (call and/or text message) are initiated in order to acquire and/or collect additional information relating to the respective emergency communication initiated by the originating client device 102.

The emergency data processing engine 130 may apply one or more techniques and/or methods for establishing the communication session with the originating client device 102, in particular a client device 102 supporting IP based communication, for example, a cellular client device 102 (e.g. Smartphone, Tablet, wearable device, etc.). For example, the emergency data processing engine 130 may identify an IP address of the originating client device 202 by analyzing the incident data, for example, the ANI/ALI information relating to the emergency communication initiated by the originating client device 202. The emergency data processing engine 130 may then establish a data communication session with a local agent executed by the originating client device 202. In another example, the emergency data processing engine 130 may identify a telephone number of the originating client device 202 by analyzing the incident data relating to the emergency communication initiated by the originating client device 202. The emergency data processing engine 130 may then transmit a text message to the originating client device 202, for example, an SMS message containing an IP address, a Unified Resource Locator (URL) and/or the like of the emergency data processing system 110. A local agent executed by the originating client device 202 may then establish a data communication session with the emergency data processing engine 130.

The additional information acquired by the emergency data processing engine 130 from the originating client device 202 may include real-time information, for example, geolocation data comprising, for example, a location of the originating client device 102 identified in real-time by one or more location sensors (e.g. GPS sensor, etc.) of the originating client device 102. In another example, the additional information may include imagery data, in particular live imagery captured in real-time, comprising one or more images, for example, a still image, a video clip and/or the like of a surrounding of the originating client device 102 captured by one or more imaging sensor of the originating client device 102. In another example, the additional information may include audio data, in particular live audio captured in real-time, comprising one or more audio playbacks captured by one or more audio sensors of the originating client device 102. Optionally, the emergency data processing engine 130 may communicate with the originating client device 202 to establish a two-way audio session with the receptive user 104 (reporter) via one or more audio output interfaces coupled to the originating client device 102, for example, a speaker, a headphone, an earphone and/or the like.

The emergency data processing engine 130 may further acquire from the originating client device 102 identification data relating to the user 104 using the originating client device 102, for example, an age, a gender, a name, a residence address, indication of whether the user is involved in the emergency event and/or the like.

Optionally, the emergency data processing engine 130 may communicate, via the network 108, with one or more of the networked resources such as the networked resources 140 to obtained advanced information relating to one or more of the originating client device 102 from which one or more of the emergency communications are initiated. For example, the emergency data processing engine 130 may communicate with an AML service configured to provide an emergency Location-Based Service (LBS) available on smartphones which is configured to identify the best available geolocation of the originating client device 102 from which an emergency communication originates. As such, the geolocation of the originating client device 102 is made available to the emergency data processing engine 130 in real-time.

The emergency data processing engine 130 may also format the additional information acquired from the EIDO, the EIDD records and/or from the originating client device(s) 102 in correlation to the emergency communication(s) as well as the advanced information received form the networked resource(s) 140 according to one or more of the predefined formatting rule(s).

In addition to processing the incident data relating to one or more of the emergency communications which is received from the communication handling system(s) 120 via the serial-to-IP gateway 122, the emergency data processing engine 130 may further process the additional information correlating to one or more of the emergency communication received at the PSAP 106. For example, if available, the emergency data processing engine 130 may further process the additional information relating to one or more of the emergency communications encapsulated according to one or more of the emergency data exchange protocol, for example, the EIDO, the EIDD and/or the like and forwarded to the emergency data processing system 110 by the serial-to-IP gateway 122. In another example, the emergency data processing engine 130 may further process the additional information acquired from one or more of the originating client devices 202. In another example, the emergency data processing engine 130 may further process the advanced information received from one or more of the networked resources 140, for example, the geolocation of the originating client device 102 received from the AML service.

The emergency data processing engine 130 may process the incident data and optionally the additional and/or advanced information in a plurality of modes for a plurality of goals and objectives. For brevity, the incident data which optionally comprises the additional and/or advanced information is collectively referred to as the incident data herein after.

For example, the emergency data processing engine 130 may process the formatted incident data to generate, in real-time, instructions for optimizing call taking of one or more additional incoming emergency communications, specifically incoming emergency calls received at the PSAP 106. For example, assuming that based on the processing and analysis of the incident data, the emergency data processing engine 130 determines that multiple emergency calls relate to the same emergency events. In such case, the emergency data processing engine 130 may instruct one or more of the dispatchers handling the multiple calls to keep handling their respective calls while instructing one or more other dispatchers to end and/or/or terminate their respective calls. In another example, assuming that based on the processing and analysis of incident data received from multiple PSAPs 106 which may be isolated from each other, possibly in different jurisdictions, the emergency data processing engine 130 determines that multiple emergency calls received at several PSAPs 106 relate to the same emergency events. In such case, the emergency data processing engine 130 may establish a cross-jurisdiction path to transfer data and/or instructions between different PSAPs 106 to optimize the call taking and/or the response to the emergency event. Moreover, assuming that based on the processing and analysis of the incident data, the emergency data processing engine 130 determines that a certain event (e.g. fire, car chase, etc.) may potentially cross to an adjacent jurisdiction. In such case, the emergency data processing engine 130 may also establish a cross-jurisdiction path to transfer data and/or instructions between the adjacent jurisdictions to optimize the call taking and/or the response to the emergency event. In another example, based on the processing and analysis of incident data, the emergency data processing engine 130 may determine that a certain emergency call is routed to an inappropriate and/or not optimal PSAP 106. For example, assuming a certain emergency call initiated from an originating client device 102 located in a first jurisdiction is routed to a PSAP 106 in a second (e.g. adjacent) jurisdiction. In such case, the emergency data processing engine 130 may instruct re-routing of the certain emergency call to another PSAP 106 located and/or in charge of the first jurisdiction.

In another example, the emergency data processing engine 130 may process the formatted incident data to compute analytics data based on analysis of the incident data of a plurality of emergency communications received by the PSAP 106. For example, based on analysis of the incident data, the emergency data processing engine 130 may compute a temporal distribution of the emergency communications received by the PSAP 106 over one or more time periods, for example, an hour, a day, a week and/or the like. In another example, based on analysis of the incident data, the emergency data processing engine 130 may compute a geographical distribution of the emergency communications received by the PSAP 106 according to the geographical areas from which the emergency communications originate. In another example, based on analysis of the incident data, the emergency data processing engine 130 may compute average values typical to the emergency communications received by the PSAP 106, for example, an average duration of an emergency call, an average time to accept an emergency call, an average time for forwarding an emergency text message and/or the like. In another example, based on analysis of the incident data, the emergency data processing engine 130 may compute analytics for one or more of the dispatchers stationed at the PSAP 106, for example, a typical duration of an emergency call handled by the respective dispatcher, a typical action time of the respective dispatcher to initiate an action in response to a received emergency call and/or the like.

In another example, the emergency data processing engine 130 may process the formatted incident data to generate one or more activation flows for transferring data to one or more of the dispatchers stationed at the PSAP 106 from one or more sources. For example, the emergency data processing engine 130 may generate one or more activation flows between one or more of the dispatchers and one or more originating client device 102 from which one or more respective emergency communications are initiated. In another example, the emergency data processing engine 130 may generate one or more activation flows between one or more of the dispatchers and one or more of the networked resources 140 configured to provide the advanced information relating to one or more of the originating client devices 102. Generating the activation flow may significantly enhance the information available to the dispatcher(s) thus creating and/or forming a comprehensive view of the emergency communication(s) for the dispatcher(s).

In another example, the emergency data processing engine 130 may further process the formatted incident data to generate information relating to one or more of the emergency communications for presentation to one or more of the dispatchers via one or more computer displays. The information presented to the dispatcher(s) may include, for example, location data of the originating client device 102, the imagery and/or audio data, specifically live imagery/audio data obtained from the originating client device 102, a name of the reporting user 104 and/or the like. In particular, after generating an activation flow between the originating client device 102 and the terminals used by one or more of the dispatchers, the emergency data processing engine 130 may direct to the dispatcher(s)'s terminal(s) data obtained from the originating client device 102.

The emergency data processing engine 130 may further interact and/or communicate with one or more additional services, platforms and/or applications to get further information which may be presented to the dispatcher(s). For example, assuming that the emergency data processing engine 130 extracts the name of the reporting user 104 and/or the number of the originating client device 102. The emergency data processing engine 130 may communicate with other services and/or service providers, for example, Uber, Waze and/or the like and, using the extracted name and/or phone number obtain further information relating to the user 104, for example, an updated location, a planned route and/or the like.

The emergency data processing engine 130 may deliver the information for view by the dispatchers, for example, by transmitting the generated information to one or more Computer Aided Dispatch (CAD) applications executed by one or more of the computers deployed at the PSAP 106 for use by the dispatchers such that the CAD application(s) may present the generated information to the dispatcher(s). Moreover, one or more high level, platform and system agnostic applications may be executed by one or more of the computers of the PSAP 106. Such The c-Live Universe platform is an over the top solution. System applications which may be easily deployed in the PSAP 106 may be configured to deliver the incident data and/or part thereof, for example, the location of the originating client device 102, live video chat, instant messaging, data sharing capabilities and more in a highly efficient and user friendly form.

In order to present appropriate and relevant data to each dispatcher, i.e., data relating to the emergency communication(s) handled by the respective dispatcher, the emergency data processing engine 130 may first correlate between the computer used by the respective dispatcher and the related emergency communication(s). The emergency data processing engine 130 may accomplish this by extracting, from the incident data, the ID (e.g., number) of the post (in the PSAP 106) which receives each emergency communication and identify the computer deployed at that post based on one or more mapping records available to the emergency data processing engine 130 which map each post with one or more computers deployed at that post (station). These record(s) (e.g. list, table, database, etc.) may further list a network address, for example, a station ID of one or more of the computers deployed at the PSAP, an IP address of each of one or more of the computers deployed at the PSAP 106 and/or the like. Using the network address obtained from the mapping record(s), the emergency data processing engine 130 may communicate with the relevant computer(s) to transmit the incident data and/or part thereof for presentation to the dispatcher(s). Moreover, in case the emergency data processing engine 130 is configured to serve multiple PSAPs 106, the emergency data processing engine 130 may first identify an origin PSAP which received the emergency communication(s) correlated to the incident data. For example, the emergency data processing engine 130 may identify a socket ID, a device ID and/or the like which may uniquely identify each serial-to-IP gateway 122. Using one or mapping records which map each serial-to-IP gateway 122 to a respective PSAP 106 in which the respective serial-to-IP gateway 122 is deployed, the emergency data processing engine 130 may identify the origin PSAP 106. Once the origin PSAP 106 is identified, the emergency data processing engine 130 may obtain the network address of the relevant computer(s) at the origin PSAP 106 and may transmit the incident data and/or part thereof for presentation to the dispatcher(s).

Generating, transmitting and presenting the information relating to the emergency communication(s) may further enrich the overall view of the dispatcher(s) on the emergency communication(s) which may lead to improved handling and/or response to the emergency communication(s).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client device, communication handling system, and emergency data exchange protocol are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for processing remotely incident data relating to emergency communication received by Public Safety Answering Points (PSAPs), comprising:
    at least one serial-to-Internet Protocol (IP) gateway deployed in at least one PSAP, the serial-to-IP gateway comprising:
        at least one serial communication interface connected to a serial communication link of the at least one PSAP to receive raw incident data relating to at least one emergency communication received by the at least one PSAP, and
        at least one network interface configured to:
            encapsulate the raw incident data in its raw form as received via the serial communication link with no adjustment to the raw incident data, in at least one IP packet, and
            transmit the at least one IP packet over an IP based network; and
    a remote server comprising:
        at least one network interface configured to connect to the serial-to-IP gateway via said IP based network; and
        at least one processor coupled to the at least one network interface, the at least one processor is configured for:
            receiving from the serial-to-IP gateway, via the IP based network, the at least one IP packet encapsulating the raw incident data,
            extracting from the at least one IP packet, the raw incident data, in its raw form as originally received via the serial communication link,
            parsing the extracted raw incident data according to at least one parsing rule applicable for the at least one PSAP,
            formatting the parsed incident data, and
            processing the formatted incident data.

2. The system of claim 1, wherein the at least one emergency communication comprises at least one of: an emergency phone call and an emergency Short Message Service (SMS) text message.

3. The system of claim 1, wherein the remote server is a cloud based system.

4. The system of claim 1, wherein the serial-to-IP gateway is configured to encrypt the at least one IP packet after the raw incident data is encapsulated in the at least one IP packet.

5. The system of claim 1, wherein the serial-to-IP gateway is configured to sign the at least one IP packet after the raw incident data is encapsulated in the at least one IP packet.

6. The system of claim 1, wherein the incident data includes at least one attribute of the at least one emergency communication retrieved from at least one Automatic Number Identifier (ANI) Automatic Location Identification (ALI) database.

7. The system of claim 1, wherein the at least one parsing rule is predefined.

8. The system of claim 1, wherein the at least one parsing rule is learned using at least one machine learning mode trained with a plurality of incident data datasets received from a plurality of PSAPs.

9. The system of claim 1, wherein the parsed incident data is formatted according to at least one predefined formatting rule.

10. The system of claim 1, further comprising communicating with at least one originating client device, from which the at least one emergency communication is initiated, to collect real-time information relating to the at least one emergency communication, the real-time information comprises at least one member of a group consisting of: a location of the at least one originating client device identified by at least one location sensor of the at least one originating client device, at least one image of a surrounding of the at least one originating client device captured by at least one imaging sensor of the at least one originating client device, and an audio playback captured by at least one audio sensor of the at least one originating client device.

11. The system of claim 10, further comprising communicating with at least one networked resource to obtain advanced information relating to the at least one originating client device.

12. The system of claim 11, wherein the processing of the formatted incident data further comprises processing the real-time information and/or the advanced information collected for the at least one emergency communication in correlation with the incident data of the at least one emergency communication.

13. The system of claim 1, wherein the processing of the formatted incident data comprises generating information relating to the at least one emergency communication for presentation to at least one dispatcher of the at least one PSAP via at least one computer display.

14. The system of claim 13, wherein the processing of the formatted incident data comprises generating at least one activation flow for transferring data to the at least one dispatcher from at least one of:
at least one originating client device from which the at least one emergency communication is initiated, and
at least one networked resource configured to provide advanced information relating to the at least one originating client device.

15. The system of claim 1, wherein the processing of the formatted incident data comprises generating, in real-time, instructions for optimizing call taking of at least one additional incoming emergency communication received by the at least one PSAP.

16. The system of claim 1, wherein the processing of the formatted incident data comprises computing analytics data based on analysis of incident data of a plurality of emergency communications received by the at least one PSAP.

17. The system of claim 1, wherein the serial-to-IP gateway further includes at least one local network interface configured to connect to at least one local network for communicating with at least one emergency communication management system, the serial-to-IP gateway is further configured to:
receive, via the local network, at least one local IP packet from the at least one emergency communication management system, the at least one local IP packet encapsulates additional information relating to the at least one emergency communication according to at least one emergency data exchange protocol, and
transmit the at least one local IP packet to the remote server.

18. The system of claim 17, wherein the at least one emergency data exchange protocol is a member of a group consisting of: an Emergency Incident Data Document (EIDO) and an Emergency Incident Data Document (EIDD).

19. A computer implemented method of processing remotely incident data relating to emergency communication received by Public Safety Answering Points (PSAPs), comprising:
using at least one processor of a remote server for:
receiving, via an Internet Protocol (IP) based network, at least one IP packet from at least one serial-to-IP gateway deployed in at least one PSAP, the at least one IP packet encapsulating raw incident data relating to at least one emergency communication received by the at least one PSAP, said raw incident data is received via at least one serial communication channel of the at least one PSAP;
extracting from the at least one IP packet, the raw incident data, in its raw form as originally received via the at least one serial communication channel of the at least one PSAP;
parsing the extracted raw incident data according to at least one parsing rule applicable for the at least one PSAP;
formatting the parsed incident data; and
processing the formatted incident data;
wherein the serial-to-IP gateway receives the raw incident data via the at least one serial communication channel and encapsulates the raw incident data in the at least one IP packet in its raw form as received via the at least one serial communication channel with no adjustment to the raw incident data.

20. A computer program product comprising program for processing remotely incident data relating to emergency communication received by Public Safety Answering Points (PSAPs), comprising:
a non-transitory computer readable storage medium having thereon:
program instructions executable by at least one processor of a remote server to cause the at least one processor to receive, via an Internet Protocol (IP) based network, at least one IP packet from at least one serial-to-IP gateway deployed in at least one PSAP, the at least one IP packet encapsulating raw incident data relating to at least one emergency communication received by the at least one PSAP, said raw incident data is received via at least one serial communication channel of the at least one PSAP;
program instructions executable by the at least one processor to cause the at least one processor to extract from the at least one IP packet, the raw incident data, in its raw form as originally received via the at least one serial communication channel of the at least one PSAP;

program instructions executable by the at least one processor to cause the at least one processor to parse the extracted raw incident data according to at least one parsing rule applicable for the at least one PSAP;

program instructions executable by the at least one processor to cause the at least one processor to format the parsed incident data; and program instructions executable by the at least one processor to cause the at least one processor to process the formatted incident data;

wherein the serial-to-IP gateway receives the raw incident data via the at least one serial communication channel and encapsulates the raw incident data in the at least one IP packet in its raw form as received via the at least one serial communication channel with no adjustment to the raw incident data.

\* \* \* \* \*